June 18, 1957 T. M. FERRILL, JR 2,796,524

TANK CIRCUIT APPARATUS

Filed April 23, 1951 4 Sheets-Sheet 1

INVENTOR

Thomas M. Ferrill, Jr.

June 18, 1957 T. M. FERRILL, JR 2,796,524

TANK CIRCUIT APPARATUS

Filed April 23, 1951 4 Sheets-Sheet 2

INVENTOR

Thomas M. Ferrill Jr.

June 18, 1957 T. M. FERRILL, JR 2,796,524

TANK CIRCUIT APPARATUS

Filed April 23, 1951 4 Sheets-Sheet 3

INVENTOR

Thomas M. Ferrill, Jr.

June 18, 1957 T. M. FERRILL, JR 2,796,524

TANK CIRCUIT APPARATUS

Filed April 23, 1951 4 Sheets-Sheet 4

INVENTOR

Thomas M. Ferrill, Jr.

2,796,524
Patented June 18, 1957

2,796,524

TANK CIRCUIT APPARATUS

Thomas M. Ferrill, Jr., Hempstead, N. Y.

Application April 23, 1951, Serial No. 222,507
15 Claims. (Cl. 250—40)

The present invention relates to tank circuit apparatus, and is particularly concerned with tank coil and capacitor systems for tuning through a very wide range of frequencies, in a series of frequency bands.

This is a continuation-in-part of my application Serial No. 795,022, filed December 31, 1947, issuing April 24, 1951, as Patent No. 2,549,789.

An object of the present invention is the provision of improved tank circuit switching, for very high electrical and mechanical efficiency.

Another object is to reduce to a minimum the interconnecting wires in the tank circuit, and to provide very short, direct paths for the high frequency currents.

A further object is to integrate the coil and switching system, and to effectuate tap switching upon the coil turns.

Yet another object is to reduce the number of moving parts and simplify the assembly of the tank apparatus.

Another object is to incorporate efficient intermittent motion in the switching and indicating arrangements of the multiple-range tank circuit apparatus.

These objects and advantages are realized in a preferred embodiment of the present invention by provision of a helix coil system and a variable tuning capacitor with the rotor axis and helix axis or axes parallel; and by provision of an elongated rotary switch shaft parallel to the coil system with spaced transversely extending contact arms arranged to make selective contact with predetermined turns in the coil system. A Geneva drive coupling system is provided between the capacitor shaft and the switch shaft, and arranged to hold the switch shaft fixed in one angular position while the capacitor shaft is adjusted through a relatively large angular range of movement. Further rotation of the capacitor shaft brings about a predetermined angular step of the switch shaft, in which it is thereupon locked for further tuning by the further rotation of the capacitor shaft.

The coil system may comprise two parallel helices, side by side, the number of turns of one being appreciably greater than the number of turns of the other. The same arms on the switch shaft which provide selective contact with one coil at a first predetermined angular position of the switch shaft, may be employed to provide selective contact with the other coil at a second predetermined angular position of the switch shaft. For balanced tank circuit operation, each of the two inductors may comprise two halves, spaced apart and connected in series, and a variable link coil may be pivoted about the axis of the switch shaft for selective coupling to one or the other of the coils and for variation of the coupling according to the angular adjustment thereof.

Shorting of predetermined portions of a coil, for reduced effective inductance therein, is accomplished by parallel arms extending outward from longitudinally separated points on said switch shaft, a conductive path being provided along the shaft between said parallel arms. Plural adjacent sections of the coil may be shorted in this manner, to avoid spurious resonances within the shorted-turns sections.

Dial means is provided with a mask intermittently driven along with the switch shaft. A calibrated dial on or coupled to the capacitor shaft may be provided with a series of arcuate scales, and windows on the mask to serve to select the scale to be viewed. Band identifying numerals are also provided on the mask.

In the appended drawings, Figs. 1, 1A, 2, 3, 4 and 5 illustrate the features of one embodiment of the invention, Fig. 1 being a plan view, and Fig. 1A being an illustration of a modified arrangement of the switch arms. Fig. 2 is a sectional view taken on the line 2—2 in Fig. 1. Fig. 3 is a perspective view of the switch shaft and arms, the coaxial link coupler system, and the intercoupling mechanism between the capacitor shaft and the switch shaft; Fig. 3A is a modified Geneva drive with a detent holding arrangement; Fig. 4 is a sectional view of the variable capacitor, taken on line 4—4 in Fig. 2. Fig. 5 is a schematic circuit diagram of the tank embodiment in Figs. 1–4.

Figs. 6, 7, 8 and 9 illustrate the features of a balanced tank circuit embodiment of the invention, Fig. 6 being a plan view and Fig. 7 being a partial sectional view, taken on line 7—7 in Fig. 6 to show the positioning of the switch shaft and the geared drive of the variable link coupler. Fig. 8 is a perspective view of the switch shaft assembly and the variable link control system thereon. Fig. 9 is a schematic circuit diagram of this tank embodiment.

Figure 1:
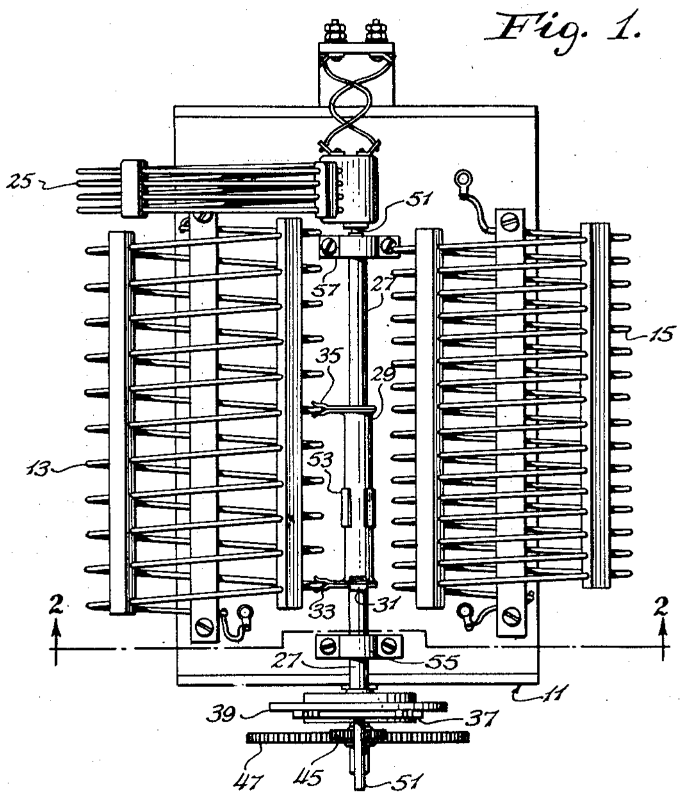

The tank system illustrated in Figs. 1–5 is a single-ended or asymmetrical tank circuit, suitable for use as a grid tank circuit or a plate tank circuit of a single tube radio frequency amplifier or oscillator, or for use where two or more tubes are connected in parallel.

A variable capacitor system 11 is arranged to support first and second inductors 13 and 15 thereon, the first inductor 13 being supported on insulating pillars 14 at the left-hand side of the tank capacitor 11, and the second inductor 15 being similarly supported on insulating pillars 16 arranged along the right-hand side of the capacitor unit 11.

The capacitor rotor comprises a set of parallel, substantially semi-circular rotor plates 17 arranged on a rotor shaft 19. The first stator 21 of the capacitor system 11, comprising relatively few stator plates, is connected to the high potential end terminal of inductor 13; and stator 23 with an appreciably greater number of plates is connected to the high potential end of the second inductor 15. Inductor 15 has an appreciably greater number of turns than inductor 13, and a correspondingly greater inductance value.

A link coupling coil 25 is provided at the rear of the tank system, and is pivoted in such a manner as to be swung into a position of maximum coupling to inductor 15. This coil 25 is arranged not only to be able to be coupled to either of the inductors, but also, to be angularly positioned for gradual adjustability of the degree of coupling to the inductor which is in use.

A hollow shaft system 27 is provided with a conductive sleeve 29 and contact arms 31, 33 and 35 arranged thereon for extending transversely to make contact with predetermined turns of inductor 13 or inductor 15, according to the angular setting of the hollow shaft 27. The front end of this hollow shaft 27 supports the slotted driven member 37 of a Geneva drive system. The driver wheel 39 carrying the drive pin 41 and locking cam 43 of the Geneva drive system is coupled by a spur gear 45 to a spur gear 47 on the capacitor shaft 19.

The gear ratio between spur gears 47 and 45 may be 4:1, so that at the completion of each quarter-revolution of gear 47, gear 45 and the Geneva drive system 39, 41, 43 coupled thereto are caused to complete a full revolution.

Arms 31 and 33 of the switch system are arranged at right angles to each other, and are so situated with respect to the driven element 37 of the Geneva drive system that either arm 31 or arms 33 and 35 are in direct full contact with predetermined coil turns of one of the inductors, each time element 37 is locked against any angular shift by the locking cam 43.

The link coil 25 is supported on a dielectric shaft 51 which passes coaxially through hollow shaft 27. Hollow shaft 27 is also made of dielectric material, a conductive path being provided only along the length of the tubular conductive sleeve 29 between contact arm 33 and contact arm 35.

A spring contact bearing 53 is provided for connection to the contact arms 31, 33 and 35 through the conductive sleeve 29. This bearing and contact element 53 serves as the high potential radio-frequency terminal for the tank circuit.

Additional bearings 55 and 57 are provided at the front of shaft 27, and at the rear of shaft 51, respectively.

Collars are employed on the shaft 27 and the inner shaft 51 adjacent bearings 55 and 57, respectively, for longitudinal positioning of these shaft elements.

Figure 1A:
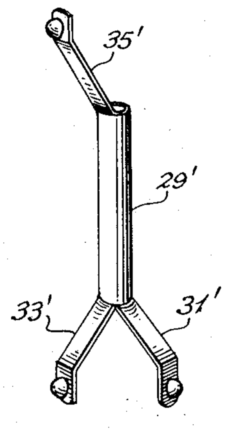
Figure 2:
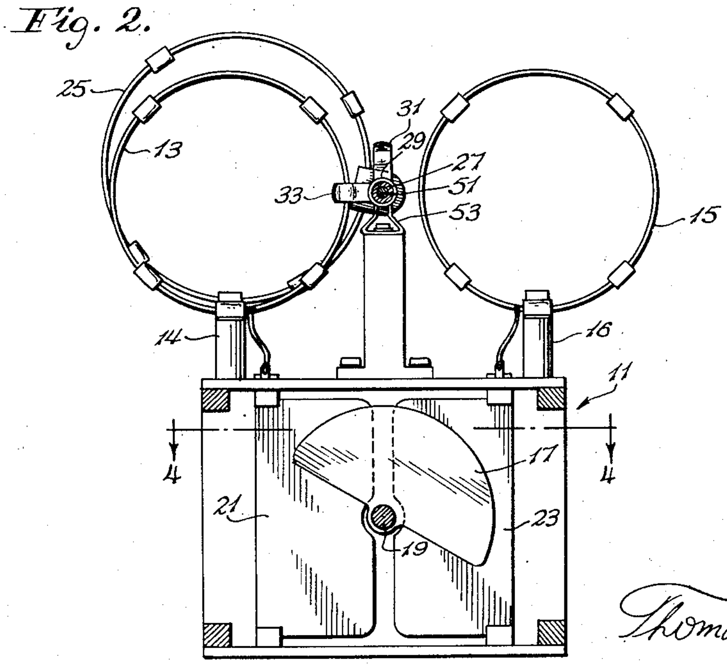

The contact arms may comprise pairs of flat spring fingers spread apart at the ends for engaging the appropriate coil turns, as shown at 31, 33, and 35, or they may be arranged as angular strips 31′, 33′ and 35′ with silver contact buttons, as indicated at Fig. 1A. As shown here, these arms may comprise cut and formed extensions of the conductive sleeve, here designated 29′.

The system as thus far described may be employed in any of a variety of circuit applications. It may be connected as an anode tank circuit in a radio frequency amplifier stage, or oscillator stage, or it may be connected in the grid circuit of a radio frequency amplifier or oscillator stage. It may be used not only in a circuit designed for transmission, but also in a receiving circuit. Likewise, it may be employed as an antenna tank circuit, or in a wavemeter type of employment.

When the tank circuit is to be used as the plate tank circuit of a medium-power oscillator or amplifier stage in a transmitter, the bearing-brush terminal 53 is connected to the anode or anodes of a single transmitting tube or a group of transmitting tubes connected in parallel. The capacitor rotor and frame and the low-potential ends of the inductors 13 and 15, connected together, are connected to a positive high voltage power supply terminal, and are maintained at ground potential for radio frequency currents by a fixed by-pass capacitor to ground.

The link coil 25 may be connected through a flexible twist section of transmission line to a low-impedance load or utilization device, such as an antenna system, or a grid tank circuit of a very high power amplifier to be driven thereby.

A tuning dial knob is attached to the capacitor shaft 19, and the link coupling control knob is attached to the front end of dielectric shaft 51. These two shafts or extensions thereof, may extend through the front panel of an enclosed transmitter system, the knobs being arranged in front of the panel for easy access.

Figures 3, 4, 5, 11:
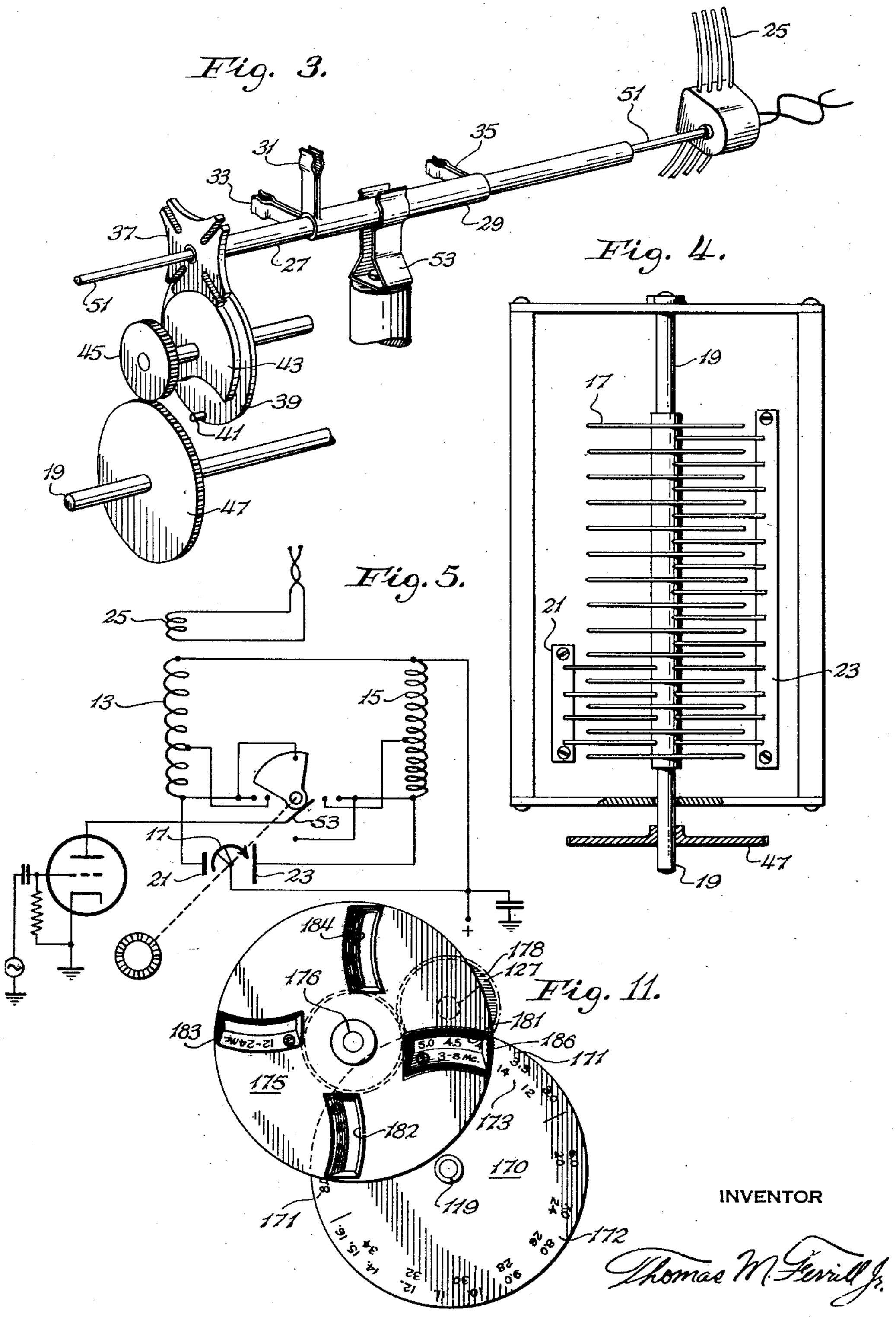
Fig. 11 illustrates the features of the special dial mechanism arranged to be driven by the capacitor shaft and switch shaft of the foregoing tank circuit apparatus.

A complete cycle of tuning of the tank system as thus far described and indicated in the circuit diagram of Fig. 5, involves four switching operations, i. e., four transfers of the switch system, and tuning through four predetermined frequency bands.

The gears between the capacitor shaft 19 and the Geneva drive system are so meshed that the Geneva drive transfer actuations of the switch shaft 27 occur at the maximum capacitance position of the capacitor, as referred to the high capacitance stator 23, and at the minimum capacitance position with respect to stator 23, and at the two positions of the shaft midway therebetween.

As the capacitor rotor is turned clockwise from the position of maximum capacitance with respect to stator 23, the switch system remains positioned with arm 31 in contact with the end of inductor 15, and with arms 33 and 35 extending substantially vertically upward from the switch shaft 27.

In this condition, the tank system may be tuned through an appreciable frequency range, as from 3.0 to 4.2 megacycles. The high frequency limit of this range is reached as the receding rotor 19 approaches a position of semi-mesh with the stator plates 23. As the rotor 19 nears this position, the Geneva drive wheel 39, turning counterclockwise, comes into engagement with the driven element 37 of the Geneva system, and drives it through a 90° angle in a clockwise direction.

Contact arm 31 now extends vertically downward, midway between the inductors 13 and 15, and contact arms 33 and 35 now rest in contact with the end turn and a predetermined intermediate turn, respectively, of inductor 15. Accordingly, the section of the inductor between the end turn and the predetermined intermediate turn is shorted out by the path from arm 33 through sleeve 29 to arm 35. The effective inductance value of this inductor is accordingly materially reduced.

By further angular operation of the capacitor shaft 19 in the clockwise direction, the tank system is now made to tune through a second predetermined frequency range, e. g., from 6 to 9 megacycles.

As the rotor 17, 19 of the capacitor approaches the position of minimum mesh with the high capacitance stator 23, the pin 41 on the Geneva drive wheel again comes into engagement with the driven element 37 of the Geneva drive system, again causing it to make a rapid advancement of 90° in the clockwise direction.

Contact arm 31 is now brought into connection with the end turn of inductor 13, while arms 33 and 35 project vertically downward from the shaft 27, out of contact with any of the coil turns. At this stage, the rotor of the capacitor has just proceeded a slight distance beyond the position of maximum mesh with the lower-capacitance stator 21. The tank circuit now comprising this stator section and the lesser inductor 13, in shunt connection, is tuned from its lower frequency band limit, as the rotor of the capacitor is turned further clockwise, to its high frequency limit as the rotor approaches the position of semi-mesh with stator 21. The frequency limits of this tuning band may be 12 to 16 megacycles for example.

As the capacitor rotor passes through the condition of mid-mesh, continuing in the clockwise direction, The Geneva driver system 39, 41, proceeding counterclockwise, again engages the driven element 37 and causes it to proceed rapidly through a further 90° clockwise transfer operation.

The switch shaft 27 is now so positioned that arms 33 and 35 both contact inductor 13, and arm 31 extends vertically upward. A predetermined appreciable section of inductor 13 is accordingly shorted out, through sleeve 29, and hence this inductor is reduced to its lower inductance value.

Now, in further turning the capacitor rotor shaft 19 clockwise, from the position of slightly less than semi-mesh with stator section 21, toward the position of minimum mesh therewith, the tank system is tuned through a final frequency range, e. g. of the order of 25 to 33 megacycles.

The Geneva driver 39, 41, 43 turns continuously as the rotor shaft is turned, but throughout 270° of rotation of this Geneva driver unit (corresponding to 67½° of rotation of the rotor shaft), the pin 41 is entriely out of engagement with the driven element 37, and the latter element is fixedly locked in position by cam 43. The entire switching action thus occurs within 90° of rotation of unit 39, 41, 43, and within 22½° of rotation of the capacitor shaft 19.

Actually, the switching transfer takes place in an even more restricted range of angular movement, because of the tangential entry and the tangential exit of the pin 41 into and out of the conditions of engagement with the driven element 37. Hence, relatively sharp action of the switching system is afforded, and nearly all of the angular adjustment range of the capacitor system is utilizable for gradual tuning adjustment.

During the operation of the tank system in the two lower frequency bands, involving the greater inductor 15, the link coil 25 is swung over substantially to the right-hand side, and is adjusted to the desired degree of coupling to the inductor 15. On the other hand, during operation of the tank system in either of the two high frequency bands, the link coil 25 is swung to the left, and adjusted to the desired degree of coupling to the lesser inductor 13.

By virtue of the gradual engagement and gradual acceleration of the driven element 37 of the Geneva drive system, the switch arms are moved out of inductor contact while the Geneva drive exercises advantageous leverage, and are made to proceed more rapidly after the contact arms have passed from engagement with an inductor. The mechanical advantage again increases as arm 31 or arms 33 and 35 approach engagement with an inductor, and the mechanical advantage is quite high as the arms are brought into their new positions of rest. Moreover, the positive locking feature of the Geneva drive system makes it especially well-suited for this application, because positive assurance is thereby provided that the contact arms will rest in the proper positions.

A further important advantage of this arrangement is the elimination of wiring to separate switch elements, and the reduction of the conductor path length between two points of a given inductor, to the minimum, assuring that the Q of the inductor remains very high when a group of turns are shorted out.

Figures 3A, 8, 9, 10:
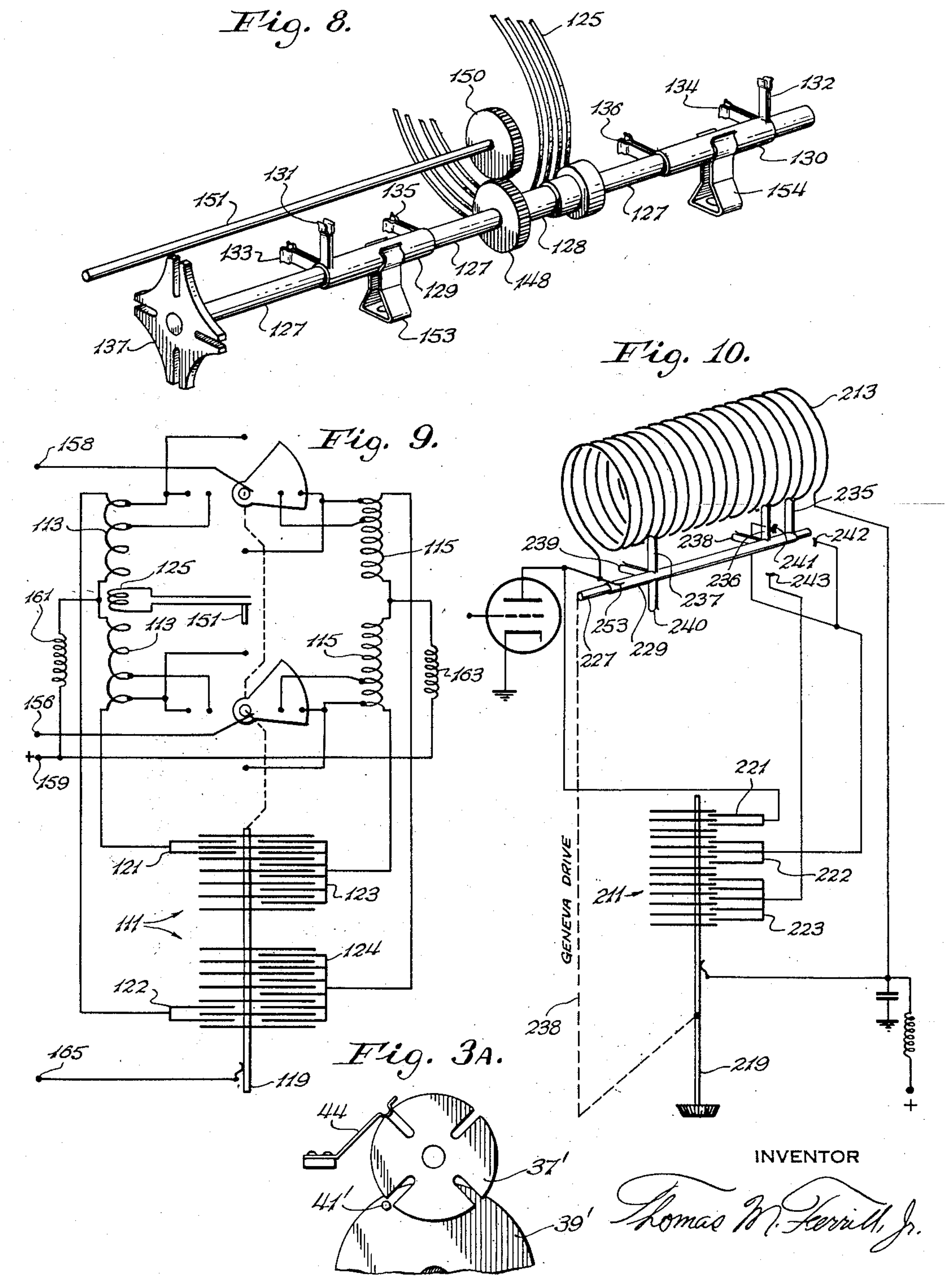
Fig. 10 is a single-inductor tank version.

If desired, a detent holding arrangement may be incorporated with the Geneva drive system, as illustrated in Fig. 3A. The driven element 37' is constructed in the same manner as element 37, except that the outline is circular—i. e., element 37' is a mere disc with radial slots. The locking cam 43 is eliminated, and a spring detent holding arrangement 44 is provided instead, for elastically engaging one of the slots at the periphery of the disc 37' at the position at which the disc 37' is left after an angular advancement thereof.

The tank system embodiment illustrated in Figs. 6–9 is closely related to the embodiment of Figs. 1–5, but is arranged for balanced or symmetrical circuit connections. The rotor system of the capacitor 111 and the mid taps of the inductors 113 and 115 are operated at substantially ground potential with respect to radio frequency currents. Symmetrical high potential radio frequency terminals are afforded, and balanced capacitor sections are provided, as indicated schematically in Fig. 9. As indicated in this figure, two large stator sections 123 and 124, are connected to the respective ends of the balanced inductor 115, and two lower-capacitance stator sections 121 and 122 are connected to the respective ends of the lower-value inductor 113.

Figure 6:
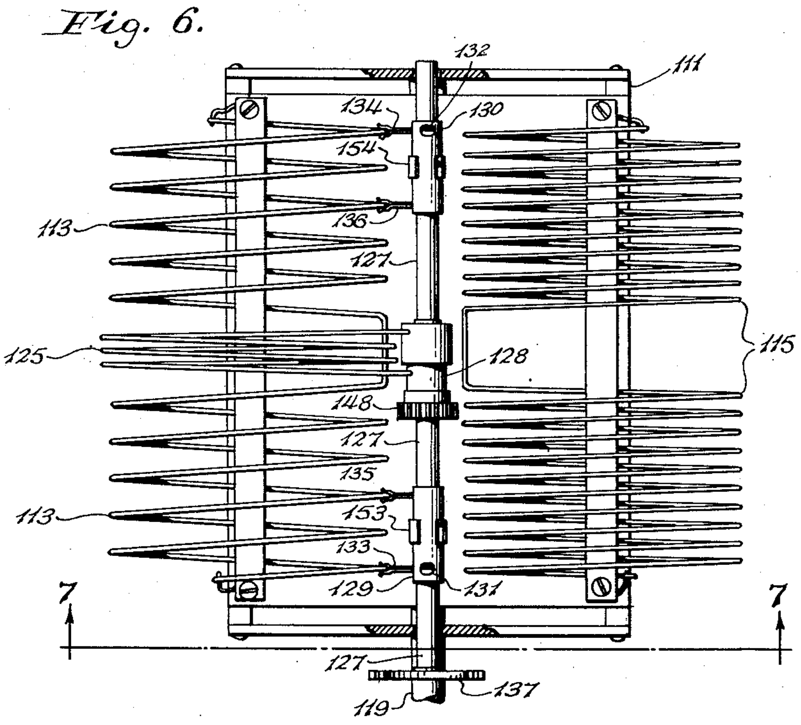
Figure 7:
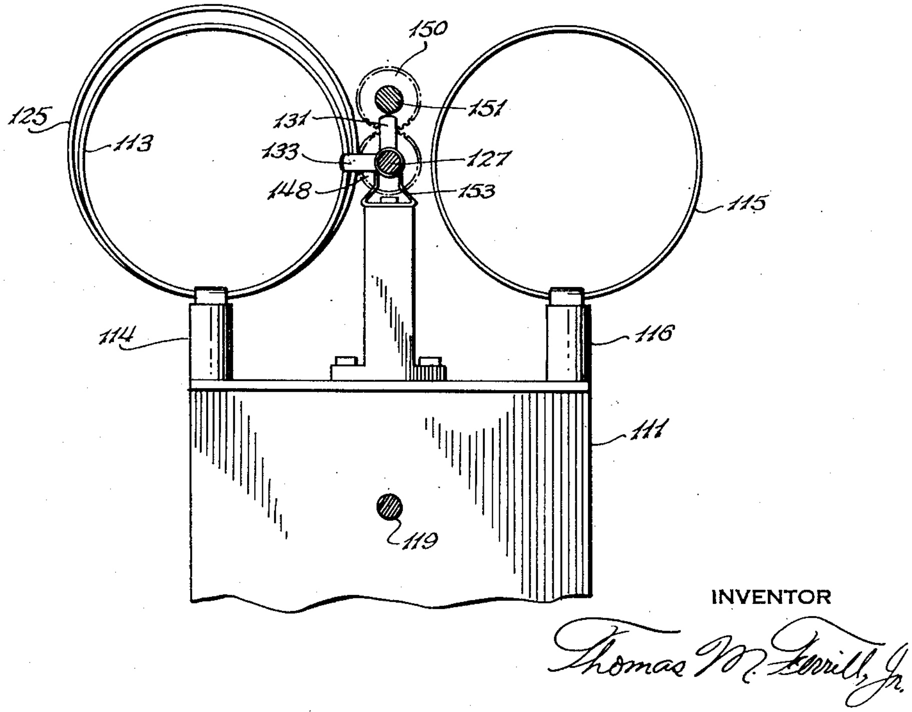

As shown in Fig. 6, the link coupling coil 125 operates in the region of the middle sections of inductors 113 and 115. Since it is necessary to provide symmetrical switching sections at the front and rear of dielectric shaft 127, a separate, freely rotatable bushing 128 is provided on this shaft, as the pivotal support for the link coil 125. This pivotal unit is coupled through spur gears 148, 150 to the link coil control shaft 151, which also is made of dielectric material. Because of the limited range of angular movement of the coil 125 and bushing 128, contacts for the ends of coil 125 may be made either by brushes or by spiral pigtail flexible connections.

A conductive sleeve 129 is provided near the front end of dielectric shaft 127, and is affixed thereto, with outwardly extending contact arms 131 and 133 from one end thereof, and arm 135 extending outward from the other end thereof, in the same angular disposition about the axis of shaft 127 as contact arm 133. The sleeves and contact arms may be made in the manner of sleeve 29 and arms 31, 33 and 35, Figs. 1 and 3, or they may be made in the manner illustrated in Fig. 1A.

A similar sleeve 130 and symmetrically disposed contact arms are provided at the rear end of the dielectric shaft 127, for symmetrical coaction with the inductors. Contact brush bearings 153 and 154 serve as the respective fixed connection point of the tank circuit.

Fig. 9 represents the scheme of operation of this balanced tank system, in much the same manner as Fig. 5 represents the circuit hook-up of the asymmetrical tank version of Figs. 1–4.

The arrangement of a large spur gear on shaft 119 of the capacitor system 111, and a smaller spur gear, a Geneva drive wheel, a locking cam and a Geneva drive pin thereon, for coaction with driven Geneva element 137, though not shown, are provided in the tank system of Figs. 6–9 in the same manner as in the tank system of Figs. 1–5.

With reference particularly to Fig. 9, two symmetrical, radio-frequency high potential terminals 156 and 158 are provided for connection to the external circuit, as for example, to the anodes of two tubes in a push-pull radio frequency power amplifier. A terminal 159 is provided for connection of the positive direct-current power source, and radio frequency choke coils 161 and 163 are connected between terminal 159 and the mid taps of inductors 121 and 123, respectively. A further terminal 165 is provided for a radio frequency ground connection, directly to the equipment chassis, or through a by-pass capacitor having a high break-down voltage rating.

As in Fig. 5, the switches and the special intermittent drive action thereof are schematically indicated in Fig. 9 by a showing of sector plate friction contact switches, of such design as to hold a fixed circuit condition through nearly 90° of rotation of the capacitor shaft, and to effectuate a transfer of the switch connections with a very slight further angular movement of the capacitor shaft.

As to the tuning and the arrangement of the transmission bands in the equipment of Figs. 6–9, the remarks applying to the operation of the tank system of Figs. 1–5 are applicable likewise to this balanced tank version.

Fig. 10 illustrates a single-inductor embodiment wherein more than two discrete inductance values are provided within one coil unit. This tank system comprises a variable capacitor unit 211 and the single inductor 213, the capacitor 211 being shown as comprising three stators 221, 222 and 223, of progressively greater numbers of plates. The capacitor rotor shaft 219 is ganged to the switch shaft 227 by mechanism including a Geneva movement (not shown), in substantially the same manner as indicated in the tank system of Figs. 1–5, the Geneva drive system for intermittent motion of the switch shaft 227 being indicated schematically by broken line 238.

Fig. 10 illustrates the use of switch arms at three positions along the switch shaft 227, and it further illustrates a fixed friction bearing connection between the conductive sleeve 229 on shaft 227 and the high potential end turn of the inductor 213, through a brush or spring contact bearing element 253.

The conductive sleeve 229 extends the full length from brush 253 to the rear contact arm 235. Contact arms 235, 236 and 237 all extend outward from the conductive sleeve 229 on shaft 227 in parallel directions, and as illustrated in Fig. 10, these three arms are all shown in contact with predetermined turns of the coil 213. Under this condition, only the turns between contact arm 235 and the low potential radio frequency terminal end of inductor 213 are free from a shorting circuit. Intermediate shorting paths are thus provided from arm 235 to arm 236, from arm 236 to arm 237, and from arm 237 through brush 253 to the end of inductor 213.

When the capacitor rotor 219 has been turned through a predetermined angular extent, shaft 227 will be turned clockwise through a 90° angle, to bring arms 238 and 239 into contact with inductor 213, with a greater number of effective turns therein, and a consequently higher inductance value effective in the tank circuit.

A further 90° step of shaft 227 brings about contact of arm 240 with the inductor 213, so that the inductance is further increased, to the next higher value.

Yet a further 90° step of the shaft 227 brings about clearance of all of the contact arms from contact with the inductor 213, and the full maximum inductance value thereof is effective in the circuit.

Where only one inductor is employed, the shaft 227 may be situated outside the inductor 213 as shown in Fig. 10, or it may be eccentrically positioned inside the inductor, parallel to the axis thereof.

Fig. 10 illustrates a further feature which may be provided in this or other versions of the tank system. This is the inclusion of stator switch contact elements, so situated as to be contacted by selected arms of the switch system, and connected to stator elements in the capacitor system, for enabling the switching system not only to change the effective inductance value of the inductor but also to bring about a change of the number of stator plates connected in the circuit.

Stator 221, having a very small number of stator plates, is shown fixedly connected to the rotor brush contact element 253, and to the radio frequency high-potential end of inductor 213. Stator 222, with an intermediate number of plates, is connected to switch stator contact elements 241 and 242. Stator 223, with the greatest number of plates, is connected to stator contact element 243.

When the switch shaft 227 is positioned as shown in Fig. 10, only capacitor stator section 221 is effective. When the switch shaft 227 has been rotated 90° in the clockwise direction, contact arm 235 engages switch element 242, effectively connecting stator section 222 in shunt with stator section 221, and thus materially increasing the capacitance value connected across the inductor.

Yet a further 90° advance of shaft 227 brings arm 235 into a position intermediate between contact elements 242 and 241, but clear of both contactors, while arm 236 is brought into engagement with stator contact element 243, so that capacitor stator sections 221 and 223 are then effective in the circuit.

Yet a further 90° advance of shaft 227 in the clockwise direction, bringing all contact arms to clear the inductor 213, places contact arm 238 in engagement with contact element 243, and simultaneously brings contact arm 235 into engagement with contact element 241, so that all capacitor stator sections are connected to the inductor, and are effective. Thus, the maximum capacitance range of capacitor 211 is made to increase in steps along with the step-wise increases of effective inductance of inductor 213.

In the embodiments of the invention as thus far described, the spur gear on the capacitor rotor shaft has been described as having four times as many teeth as the driven spur gear which is associated with the driving element of the Geneva movement, as illustrated in the embodiment of Figs. 1–5. With this arrangement, switching operations occur at intervals of 90° in the rotation of the capacitor shaft, and the complete cycle of operation of the tank system occurs in 360° of rotation of the capacitor shaft. Thus, the tuning system proceeds through four separate ranges of moderate frequency extent, in the examples as thus far described, with the four-point Geneva drive unit.

In some applications, it may be desired to provide tuning ranges of greater frequency band extent. This is particularly true if very wide tolerances as to external circuit conditions are to be met, or if it is desired to have the tank capable of being tuned to any frequency within a very wide range, the tank system being made to tune through a series of overlapping tuning ranges.

For this purpose, the pair of spur gears on the capacitor shaft and the Geneva driver shaft may be replaced by spur gears having a 2:1 ratio, so that the Geneva driver turns at twice the angular rate of the capacitor shaft. With this arrangement, the capacitor shaft is rotated from a position of nearly maximum capacitance in the effective stator section or sections, to a position of slightly more than minimum capacitance, while the switch arms remain stationary. Thereafter, transfer of the switch arms takes place just as the capacitor shaft turns through a minimum-capacitance position, and a further capacitor range of slightly less than 180° is then available, with a different tuning range, by virtue of the intervening change in the effective inductance value.

With this arrangement, the tuning bands may be made quite broad, and they may be designed for overlap in frequency coverage, so that the tank system may be tuned to any frequency within a very broad range.

A set of illustrative tuning ranges to be covered by the tank system wherein the gear ratio is 2:1, is as tabulated below:

| | Megacycles |
|---|---|
| Band No. 1 | 3–8 |
| Band No. 2 | 6–16 |
| Band No. 3 | 12–24 |
| Band No. 4 | 20–35 |

Fig. 11 illustrates a dial arrangement which may be provided where the 2:1 ratio spur gears are employed, for operation of the tank system through four successive tuning ranges each having slightly less than 180° tuning extent with respect to the operation of the capacitor rotor shaft.

Reference will be made to the capacitor rotor shaft 119 of the tank system of Figs. 6–9, and to the switch shaft 127 and the link coupler shaft 151 thereof.

A dial disc 170 is provided on the capacitor shaft 119, and is calibrated with markings representing four tuning ranges, each of slightly less than 180° angular extent. Two of the tuning ranges are disposed at a slightly smaller radius than the other two, to keep the indications of each band entirely distinct from those of the other tuning ranges.

A further disc 175 is provided on a shaft 176 offset from but parallel to shaft 119. This disc 175 is arranged to provide band numeral markers, markings of the band ranges, and in addition, to provide selective windows to permit the viewer to see only that scale on dial disc 170 which corresponds to the tuning range in which the tank system is being operated.

An escutcheon plate 186 is provided in the panel of the radio equipment in which the tank system is installed. This escutcheon plate has generally arcuate upper and lower borders, and substantially vertical parallel sides. The height of the window space provided therein is sufficient to permit viewing of both the inner and outer scales on the dial 170.

Disc 175 is illustrated as being coupled through 1:1 spur gears 177 and 178 to the switch shaft 127. In this arrangement, the arcuate windows 181, 182, 183 and 184 are arranged in substantially radial positions, and they appear to ascend or descend into viewing position, depending upon the direction in which the capacitor shaft 119 is rotated by the control knob (not shown).

For a given position of the mask disc 175, while the switch arms are stationary, the appropriate window for viewing the desired band is in register with the greater escutcheon plate window, e. g., window 181 is in register with the upper half of the window area of the escutcheon plate 186. The numeral "1," encircled, appears on the surface of the disc 175 just below window 181, and the approximate limit frequencies of the tuning range may also be denoted on the area just beneath window 181.

Near the end of 180° of rotation of shaft 119, in the clockwise direction, and as the rotor approaches the condition of minimum mesh with the major stator units (123 and 124, Fig. 9), the transfer of the switch elements takes place for shorting out portions at the ends of the greater inductor 123, Fig. 9. Along with this switch transfer, the selective masking dial 175 is likewise rotated through 90°, in the counterclockwise direction. Window 182 is so situated that it will register in the upper half of the window of escutcheon plate 186, in the same manner as window 181. The encircled numeral "2" and band limit markings "16—6 mc." are provided beneath window 182, in the same general fashion as in connection with window 181.

For the next tuning range of slightly less than 180°, window 183 is shifted into position in register with the lower half of the window area of escutcheon 186. In this case, the band designation and the band limit markings are provided above the window 183. Similarly, at the next switching operation (for a yet higher frequency band), window 184, in turn, registers in the lower half of the window area of escutcheon plate 186, and the band markings are likewise provided above this window 184.

This dial system shows the way in which this tank system is operated with entire freedom from ambiguities of response frequencies, and likewise, with freedom from ambiguities of the calibration. The Geneva drive system not only provides substantially ideal motion for the rotary switching system, but also it provides ideal functioning of the mask plate 175.

The dial system of Fig. 11 can be modified, if desired, for use where the tuning ranges are included within 90° segments of capacitor rotation. On the other hand, one may employ 1:1 ratio spur gears on the capacitor shaft and the Geneva driver, if it is desired to have only one switch transfer action occur for each successive revolution of the capacitor shaft. With such an arrangement, the variable capacitor system may be tuned entirely from its maximum capacitance position to its minimum capacitance position, and beyond, prior to the circuit interruption by the action of the switching system. In this event, the four arcuate calibration scales on dial 170 are all of different radii, and are arranged in a common substantially semi-circular sector.

It is not essential that the masking disc be on a separate shaft from the switch shaft 127. It may be fixed directly on this shaft, the window openings being made to come into view behind the escutcheon plate 186 as they progress to the lowest point in their circular orbits.

It will be readily apparent that fixed contact elements may be employed in the switch embodiment of Figs. 1–5, or in the switch embodiment of Figs. 6–9, for selective interconnection of capacitor sections with the remaining portions of the tank system, in the same general manner as accomplished in the embodiment of Fig. 10.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Multiband tank circuit apparatus comprising a variable capacitor having a rotor shaft, at least one helical inductor supported on said capacitor with its axis parallel to said rotor shaft, a switch shaft parallel to said axis, means including a Geneva drive coupling said capacitor rotor shaft to said switch shaft for providing intermittent predetermined angular advancements of said switch shaft as said rotor shaft passes through predetermined angular positions, means including at least one transversely extending switch arm on said switch shaft for selectively contacting said inductor at a predetermined point thereon when said switch shaft is in a predetermined angular position of rest between intermittent advancements thereof, means interconnecting said capacitor and inductor in a parallel-resonant circuit, a dial coupled to said capacitor rotor shaft to turn continuously with the rotation thereof, said dial having a plurality of calibration zones, and a selective window mask disc coupled to said switch shaft to be intermittently advanced therewith, said mask disc having band markings thereon and windows therein for selective viewing of respective calibration zones of said dial.

2. Multiband tank circuit apparatus as defined in claim 1, wherein said capacitor includes a plurality of sections of different maximum capacitance values, said apparatus including means responsive to intermittent advancements of said switch shaft for selectively connecting predetermined capacitor sections in said tank circuit.

3. Multiband tank circuit apparatus comprising a variable capacitor having a rotor shaft, at least one helical inductor, a switch shaft parallel to the axis of said inductor, means including intermittent drive mechanism intercoupling said capacitor rotor shaft and said switch shaft for providing intermittent angular advancements of said switch shaft as said rotor shaft passes through predetermined angular positions, means including at least one switch arm on said switch shaft for selectively contacting said inductor when said switch shaft is in a predetermined position of rest between intermittent advancements thereof, and a two-part dial system comprising a dial disc coupled to said capacitor shaft to turn therewith, and a band selection disc coupled to said switch shaft to be intermittently advanced therewith.

4. Multiband tank circuit apparatus comprising a variable capacitor having a rotor shaft, first and second helical inductors having parallel axes, a switch shaft between said inductors parallel to said axes, means including intermittent drive mechanism intercoupling said capacitor rotor shaft and said switch shaft for providing intermittent angular advancements of said switch shaft as said rotor shaft passes through predetermined angular positions, means including at least one switch contact arm on said switch shaft for selectively contacting said first inductor when said switch shaft is in a predetermined position of rest between intermittent advancements thereof and for selectively contacting said second inductor when said switch element is in another predetermined position of rest between intermittent advancements thereof.

5. Multiband tank circuit apparatus comprising a variable capacitor having a rotor shaft, a low capacitance stator system and a high-capacitance stator system; first and second helical inductors having parallel axes, said second inductor having a higher inductance value than said first inductor; means connecting said low-capacitance stator system to said first inductor and connecting said high-capacitance stator system to said second inductor; a switch shaft between said inductors parallel to said axes; means including a Geneva drive mechanism intercoupling said capacitor rotor shaft and said switch shaft for providing intermittent angular advancements of said switch shaft as said rotor shaft passes through predetermined angular positions; a plurality of contact arms on said switch shaft, said contact arms including at least two arms spaced apart along said switch shaft and connected together and extending outward therefrom in a common angular alignment, and at least one additional arm extending outward from said switch shaft in a different angular direction.

6. Multiband tank circuit apparatus as defined in claim 5, further including variable coupling means comprising a link coil pivotally supported about the axis of said switch shaft, and means for swinging said link coil from a position of coupling to one of said inductors to a position of coupling to the other of said inductors and for angularly adjusting the degree of coupling to the selected inductor.

7. Multiband tank circuit apparatus as defined in claim 6, wherein said first and second inductors each include two symmetrical coil portions spaced apart along the respective inductor axes, and said low-capacitance stator system including a pair of balanced stator sections and said high-capacitance stator system including a pair of balanced stator systems, said tank circuit apparatus further including a set of contact arms on said switch shaft symmetrical with said two arms and said additional arm for contacting symmetrically disposed turns of the respective inductors.

8. In combination, a Geneva drive system including a rotable driving element and a driven element having multiple radial slots therein, a dial coupled to said driving element for continuous rotation therewith, said dial having a plurality of arcuate calibration scales thereon, and a selective mask element coupled to said driven element and having a plurality of windows at predetermined angular intervals therein, the windows of said mask element being arcuate and the radii to the respective centers of window area thereof having substantial tangential components relative to said mask, said driving element including means for intermittently engaging said driven element and advancing said driven element and said mask element through predetermined angular steps from a position of register of one window with one calibration scale to a position of register of another window with a further calibration scale.

9. In combination, first and second helical inductors having their axes mutually parallel, said second inductor having appreciably more turns per unit length than said first inductor, a rotatable switch shaft extending parallel to the axes of said inductors, said switch shaft being situated substantially between said inductors and in the plane of symmetry of the axes of said first and second inductors, and a plurality of contact arms on said switch shaft, at least two of said arms being aligned for simultaneously contacting two different turns of said first inductor when said switch shaft is in one predetermined position and for simultaneously contacting two different turns of said second inductor when said switch shaft is in a further predetermined position, the two different turns contacted on said second inductor being spaced a greater number of turns apart than the two turns of said first inductor contacted when said shaft is in said first predetermined position, and at least one further contact arm on said switch shaft angularly disposed from said two arms, said further contact arm comprising means for disengagement from said inductors when said two arms are engaged with either inductor and for selective engagement with said first inductor or said second inductor accompanied by disengagement of said two arms.

10. The combination defined in claim 9, further comprising means for advancing said shaft through a series of predetermined angular steps, said means including a Geneva drive system having a multiply substantially radially slotted wheel coupled to said switch shaft, an eccentric driver for engaging said wheel in one slot thereof and advancing said wheel to bring a further slot thereof into position for a following engagement, and means rotated by said eccentric driver for gradually tuning the circuit of the inductor engaged by an arm of said switch shaft according to the angular position of said driver.

11. Tuned circuit apparatus comprising a variable capacitor having a rotor shaft, a multiple-turn helical inductor connected to said variable capacitor to form a tuned circuit, a switch shaft extending parallel to the axis of said inductor, a plurality of switch contact elements fixed to said switch shaft at different positions therealong for contacting plural turns of said inductor in one predetermined angular position and for contacting at least one turn of said inductor in another predetermined angular position, and intermittent motion driven means intercoupling said capacitor rotor shaft and said switch shaft, said intermittent motion drive means comprising means actuated upon completion of a predetermined angular adjustment range of said capacitor rotor shaft for advancing said switch shaft from one of its predetermined positions to a further predetermined position therefor, whereby continued rotation of said variable capacitor rotor shaft results in turning of said tuned circuit through a further range of gradual tuning thereof.

12. Tank circuit apparatus comprising a variable capacitor and inductance means electrically interconnected in a tunable resonant circuit, said variable capacitor having a motor shaft, means for switching said inductance means from one predetermined inductance value to at least one further predetermined inductance value for shifting the resonance range of said resonant circuit, said switching means having a switch shaft operable through predetermined angular switching steps, and a Geneva drive system having an eccentric driver coupled to said capacitor rotor shaft and a star wheel coupled to said switch shaft, whereby said capacitor rotor shaft is adjustable through an angular range of gradual tuning of said resonant circuit between positions of engagement of said Geneva drive system, and is rotatable through said positions of engagement for effecting angular advancements of said switching means to change the range of gradual tuning of said resonant circuit.

13. Tank circuit apparatus as defined in claim 12, further including angularly adjustable inductive coupling means pivoted about the axis of said switch shaft for variation of its positional relation and degree of coupling to said inductance means.

14. Tank circuit apparatus as defined in claim 13, wherein said inductance means comprises a plurality of inductors arranged substantially symmetrically about said switch shaft.

15. Tank circuit apparatus as defined in claim 12, including a dial system comprising a first dial part coupled to said eccentric driver and a second dial part coupled to said star wheel and cooperating with said first dial part to indicate the tuning range thereof.

References Cited in the file of this patent

UNITED STATES PATENTS

| | | |
|---|---|---|
| 247,459 | Wythe | Sept. 20, 1881 |
| 881,729 | Smith | Mar. 10, 1908 |
| 1,166,453 | Gaumont | Jan. 4, 1916 |
| 1,687,500 | Langley | Oct. 16, 1928 |
| 1,763,287 | Trogner | Jan. 10, 1930 |
| 1,830,682 | Trogner | Nov. 3, 1931 |
| 1,863,392 | Brand et al. | June 14, 1932 |
| 1,930,714 | Heintz | Oct. 17, 1933 |
| 1,945,525 | Gebhard | Feb. 6, 1934 |
| 1,955,639 | Kline | Apr. 17, 1934 |
| 1,958,282 | Tregenza | May 8, 1934 |
| 2,023,235 | Le Count | Dec. 3, 1935 |
| 2,348,222 | Olson | May 9, 1944 |
| 2,493,746 | Bowden | Jan. 10, 1950 |
| 2,560,964 | Lander | July 17, 1951 |

FOREIGN PATENTS

| | | |
|---|---|---|
| 218,574 | Germany | Feb. 7, 1910 |
| 683,006 | France | Feb. 24, 1930 |
| 109,945 | Australia | Feb. 28, 1940 |